H. SCHUMACHER.
CONTROLLING DEVICE FOR PET COCKS.
APPLICATION FILED JUNE 8, 1921. RENEWED MAY 8, 1922.
1,437,156.                                           Patented Nov. 28, 1922.
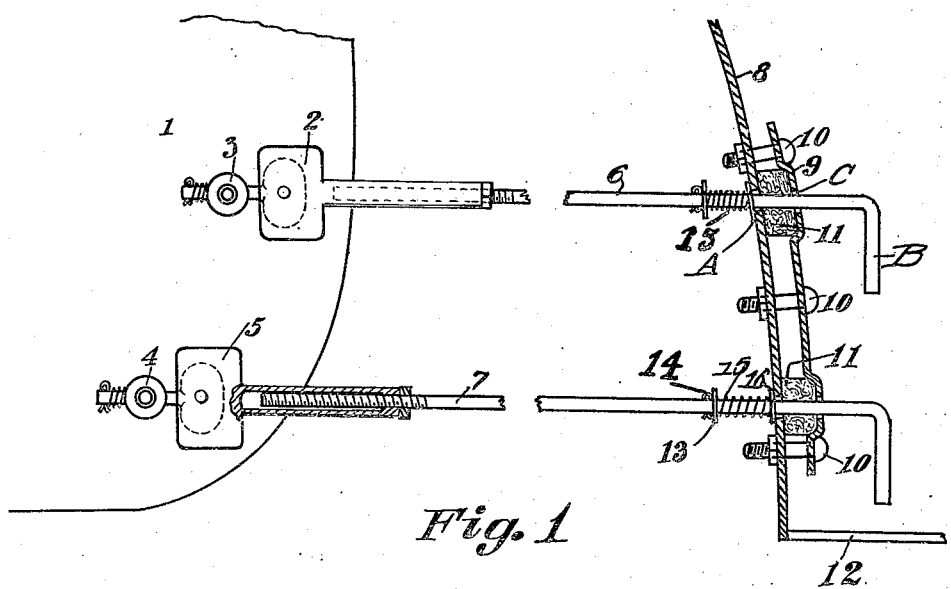
Fig. 1
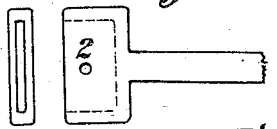
Fig. 6.
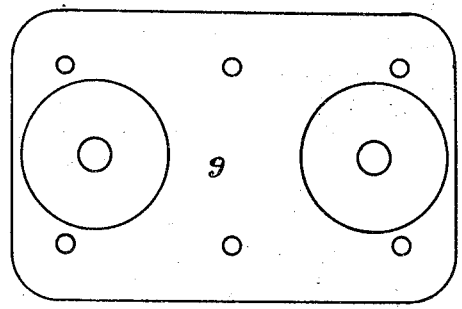
Fig. 3   Fig. 7.   Fig. 2
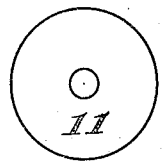
Fig. 5.
Fig. 4
INVENTOR
Henry Schumacher
BY
Thomas Ackerman
ATTORNEY Patented Nov. 28, 1922.

1,437,156

UNITED STATES PATENT OFFICE.

HENRY SCHUMACHER, OF ALMA, MISSOURI.

CONTROLLING DEVICE FOR PET COCKS.

Application filed June 8, 1921, Serial No. 475,967. Renewed May 8, 1922. Serial No. 559,425.

*To all whom it may concern:*

Be it known that I, HENRY SCHUMACHER, a citizen of the United States of America, and resident of Alma, in the county of Lafayette and State of Missouri, have invented certain new and useful Improvements in Controlling Devices for Pet Cocks, of which the following is a specification.

This invention relates to devices for holding the pet cocks of crank cases in a closed position, or the said device is operative to indicate a condition should the pet cocks become opened accidentally as sometimes occurs when an automobile is travelling through weeds or underbrush, and the condition also results from other causes, which it is desirable to be able to detect without the necessity of exploring under the motor.

An object of this invention is to produce a device having rod retaining elements operative by friction to prevent the accidental movement of the said rods, the said device having novel means for increasing friction between the friction member and the rod to compensate for wear or deterioration.

It is a further object of this invention to provide a rod having pet cock engaging elements which may be applied to or removed from the valve stem whereby a relatively close joint is formed between the socket and the pet cock to prevent accidental displacement or disengagement of these elements, and a still further object of this invention is to provide means for urging the rod toward the pet cock to maintain the relation of parts just indicated.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which—

Figure 1 is a sectional view of a portion of a vehicle body structure, with the device embodying the invention applied thereto, the crank case of a motor being conventionally shown;

Figure 2 is a plan view of a retaining plate;

Figure 3 is an end view of the pet cock socket;

Figure 4 is a plan view of a friction disk;

Figure 5 is a sectional view thereof;

Figure 6 is a view in elevation of the pet cock socket; and

Figure 7 is a sectional view through the plate.

In these drawings 1 denotes the crank case, 3 and 4 pet cocks applied thereto, and 2 a pet cock socket which engages a handle 5 of a turning plug of a pet cock, there being a rod 6 for operating the pet cock 3, and a handle 7 for operating the pet cock 4.

The rods 6 and 7 which carry the sockets extend through apertures in the apron 8 such as is used just below the body on an automobile, the said apertures being identified by the letter A and they are larger than the rods. The rods preferably terminate in angularly disposed portions such as B in order that it can be told whether the rods have rotated, the same being determined by the positions of the angularly disposed ends of the rods.

Friction disks such as 11 have apertures through which the rods extend and the apertures of the disks are restricted so that they fit on the rods in a manner to cause friction when the rods are rotated in the disks. While I have referred to the elements 11 as disks, it is to be understood that their configuration in plan is immaterial and that they may be round or angular in plan. A plate 9 has apertures C through which the rods extend and this plate is secured to the apron by fastenings 10 such as bolts, with the friction elements interposed between the plate and the apron. The plate is preferably provided with embossed portions forming seats for the friction members and these seats preferably conform to the contour of the said friction members. This arrangement prevents the expansion of the disks outwardly to such an extent as to increase the frictional contact of the said disks with the said rods.

The disks are preferably formed from leather or some material having high wearing qualities and a material that will retain its pliable state for a long time. By the use of such durable material their renewal will not be necessary except at long intervals.

Each rod has a cotter pin 14 extending through it to form an abutment for a disk 13 and a spring 15 encircles each rod between a disk and the apron or a washer 16 interposed between the apron and the spring, and this arrangement causes the spring to exert force on the rod in order that the pet cock socket will be held in engagement with the pet cock with which it is to coact. Of course by a pull on the rod against the connection of the spring a disengagement of the socket and pet cock can be effected, but the normal positions of the parts as shown in Fig. 1 will be maintained under ordinary conditions of use.

As shown by the upper friction member, when the said friction member is set diagonally with respect to the axis of the rod the disk will be distorted slightly and its frictional effect or action will be greater than with the lower friction member which stands approximately at right angles to the axis of the rod.

The provision which has been made for adjusting the plate to increase its pressure on the friction members will prove effective to take up lost motion which might occur through wear on the friction members and owing to the fact that the disks are relatively small they can be affected with a slight adjustment of the plate.

The device is so constructed that the pet cocks can be manipulated through the operation of the rods, but the said rods are frictionally held to guard against accidental movement under service conditions.

The handles are made adjustable by threading into the sockets of the pet cock, as shown in the drawings.

I claim:

In a device for operating pet cocks, a rod having a socket to receive the end of a valve stem of a pet cock, the said socket conforming to the contour of the said end whereby the motion of the rod is communicated to the pet cock, a member through which the rod extends, a spring encircling the rod and having one end abutting the member through which the rod extends, a friction element on said rod bearing against the said member, a plate having a cup the wall of which is of the configuration of the friction element and in which the said friction element is seated, the said plate having an aperture in the cupped portion through which the valve stem extends, and means extending through the member and the plate for adjustably attaching the plate to the member and effective to compress the friction element.

HENRY SCHUMACHER.